US008928677B2

(12) United States Patent
Wexler et al.

(10) Patent No.: US 8,928,677 B2
(45) Date of Patent: Jan. 6, 2015

(54) LOW LATENCY CONCURRENT COMPUTATION

(75) Inventors: Daniel Elliot Wexler, Soda Springs, CA (US); Jeffrey A. Bolz, Austin, TX (US); Jesse David Hall, Santa Clara, CA (US); Philip Alexander Cuadra, San Francisco, CA (US); Naveen Leekha, Durham, NC (US); Ignacio Llamas, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 13/357,569

(22) Filed: Jan. 24, 2012

(65) Prior Publication Data

US 2013/0187935 A1 Jul. 25, 2013

(51) Int. Cl.
*G06F 15/80* (2006.01)
*G06T 1/20* (2006.01)

(52) U.S. Cl.
USPC .......................................... 345/505; 345/506

(58) Field of Classification Search
CPC ...... G06T 1/20; G06T 15/005; G06T 2210/52
See application file for complete search history.

(56) References Cited

U.S. PATENT DOCUMENTS

| | | | | |
|---|---|---|---|---|
| 5,978,858 | A * | 11/1999 | Bonola et al. | 710/1 |
| 6,189,064 | B1 * | 2/2001 | MacInnis et al. | 710/244 |
| 7,480,788 | B2 * | 1/2009 | Suzuki | 712/225 |
| 7,640,381 | B1 * | 12/2009 | Zhang et al. | 710/56 |
| 8,477,082 | B2 * | 7/2013 | Lee et al. | 345/2.1 |
| 2007/0132770 | A1 * | 6/2007 | Stefanidis et al. | 345/541 |
| 2008/0198153 | A1 * | 8/2008 | Yu et al. | 345/214 |
| 2010/0198995 | A1 * | 8/2010 | Takamoto | 710/6 |
| 2011/0050713 | A1 * | 3/2011 | McCrary et al. | 345/522 |

* cited by examiner

*Primary Examiner* — David Zarka
*Assistant Examiner* — Tapas Mazumder
(74) *Attorney, Agent, or Firm* — Patterson & Sheridan, LLP

(57) ABSTRACT

One embodiment of the present invention sets forth a technique for performing low latency computation on a parallel processing subsystem. A low latency functional node is exposed to an operating system. The low latency functional node and a generic functional node are configured to target the same underlying processor resource within the parallel processing subsystem. The operating system stores low latency tasks generated by a user application within a low latency command buffer associated with the low latency functional node. The parallel processing subsystem advantageously executes tasks from the low latency command buffer prior to completing execution of tasks in the generic command buffer, thereby reducing completion latency for the low latency tasks.

14 Claims, 6 Drawing Sheets

LOW LATENCY CONCURRENT COMPUTATION

BACKGROUND OF THE INVENTION

1. Field of the Invention

The present invention generally relates to parallel processing methods and more specifically to low latency concurrent computation.

2. Description of the Related Art

A modern computer system typically includes both a central processing unit (CPU) and a co-processor, such as a graphics processing unit (GPU). An operating system (OS) executing on the CPU manages overall operation of the computer system and provides an execution environment for applications. One specific function of the OS involves scheduling workloads associated with a given application for execution on the CPU and the GPU. In a conventional usage model, a portion of the application workload executes on the CPU, which generates a GPU workload that is scheduled by the OS for execution on the GPU. The GPU workload comprises certain operations that map efficiently to the GPU, such as operations that perform physics simulations, render images, and the like.

The GPU includes a specific set of data processing resources, which are exposed as processing nodes to the OS via a GPU driver. Each node represents a specific type of function such as a graphics engine, a copy engine, a video engine, and the like. The OS schedules a given task to a corresponding node based on the task type. For example, the OS may schedule tasks related to copying units of data to the copy engine via a node corresponding to the copy engine. Similarly, the OS may schedule computational tasks to the graphics engine to perform physics simulation and image rendering.

In a conventional OS execution environment, the GPU driver is configured to generally decouple execution of tasks on the CPU from execution of tasks on the GPU, thereby enabling the CPU to generate and schedule tasks for the GPU ahead of the GPU actually being free to process the tasks. The OS schedules tasks for the GPU via a specific command buffer assigned to a corresponding node. In data flow systems where the CPU does not depend on results from the graphics engine node, decoupling CPU and GPU execution can generally avoid starvation of the GPU and avoids the CPU having to wait for the GPU to complete a given task. However, in a data flow system where the graphics engine generates results upon which the CPU depends for further progress, the CPU and GPU can spend significant portions of time waiting for each other. One example of a data flow system with interdependencies between the CPU and GPU includes a physics-driven graphics system. Physics simulations are performed by the GPU, with results transmitted back to the CPU to be used in generating a scene description, which is then rendered to an image by the GPU. In this example, the OS schedules physics tasks and rendering tasks sequentially to a command buffer for the graphics engine node, and the serial data dependency results in serialized execution of tasks that could potentially be executed in parallel. The resulting task serialization reduces performance and overall system efficiency.

Accordingly, what is needed in the art is an improved system and method for execution concurrency between the CPU and the GPU.

SUMMARY OF THE INVENTION

One embodiment of the present invention sets forth a method for low latency computation in a parallel processing subsystem, comprising exposing a low latency functional node that shares a common underlying processor resource within the parallel processing subsystem with a generic functional node, receiving a request to execute one or more tasks associated with the low latency functional node, wherein each of the one or more tasks is stored in a low latency command buffer, scheduling the low latency command buffer for execution in the parallel processing subsystem, and receiving a first completion interrupt from the parallel processing subsystem that indicates that the one or more tasks stored in the low latency command buffer have completed execution.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that higher overall system performance may be achieved through improved execution concurrency between a processor, such as a central processing unit (CPU), and the parallel processing subsystem. In one embodiment the parallel processing subsystem comprises a graphics processing unit (GPU).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
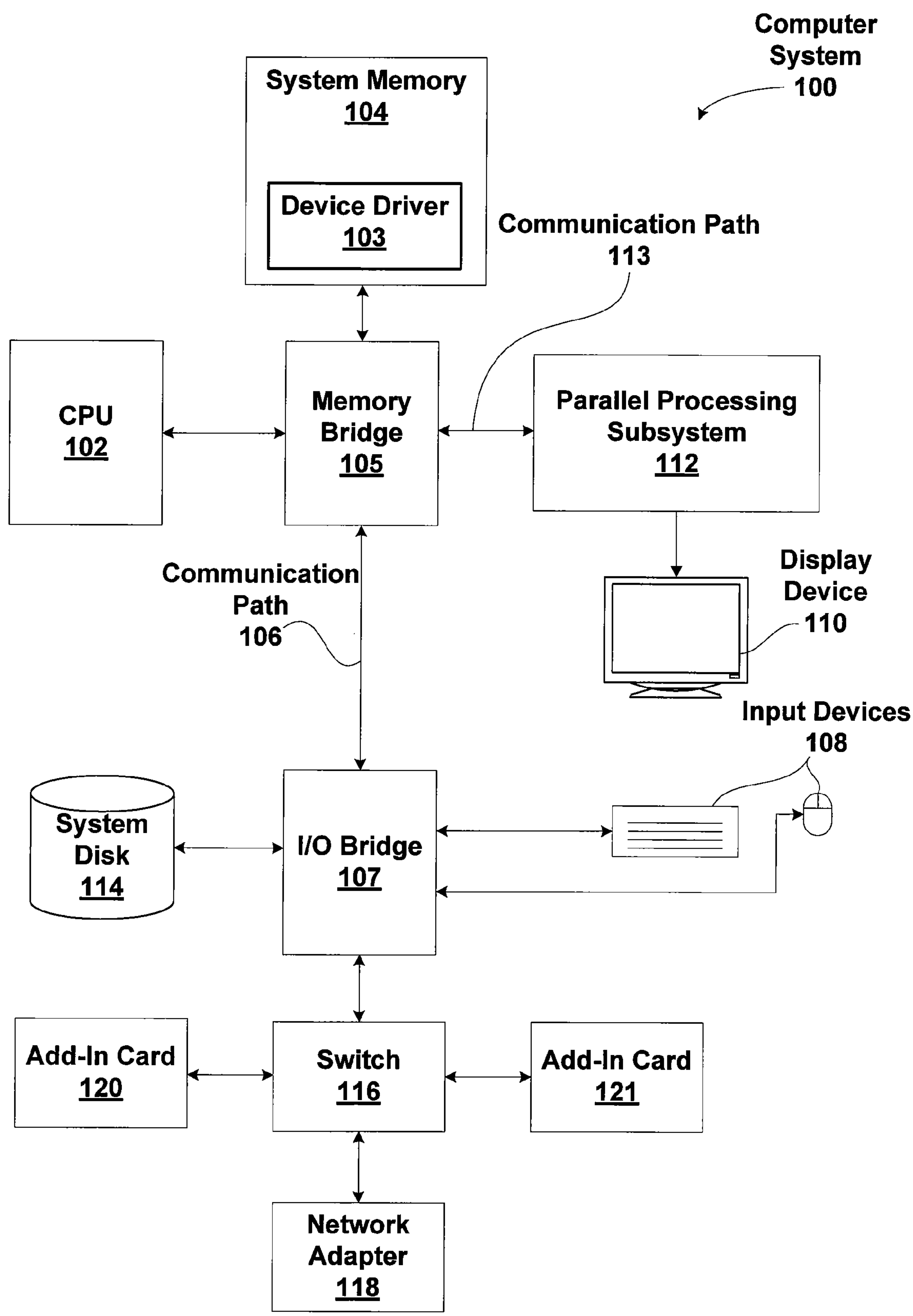
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
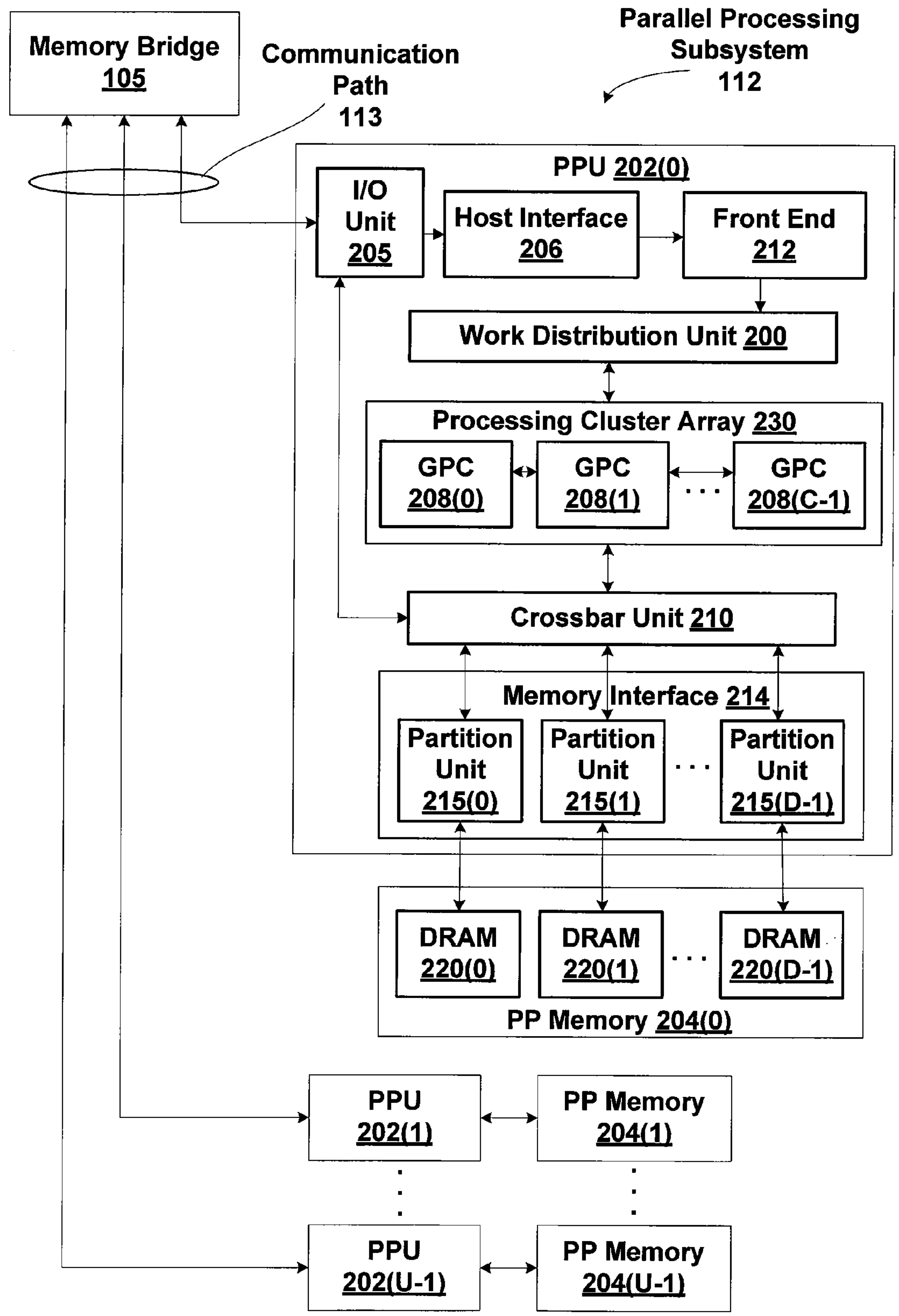
FIG. 2 is a block diagram of a parallel processing subsystem for the computer system of FIG. 1, according to one embodiment of the present invention.

FIG. 2 is a block diagram of a parallel processing subsystem 112 for the computer system 100 of FIG. 1, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

In some embodiments, some or all of PPUs 202 in the parallel processing subsystem 112 are graphics processors with rendering pipelines that can be configured to perform various tasks related to generating pixel data from graphics data supplied by CPU 102 and/or system memory 104 via memory bridge 105 and communications path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device (s). One or more PPUs 202 may output data to display device 110 or each PPU 202 may output data to one or more display devices 110.

In operation, CPU 102 is the master processor of the computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like

Low Latency Computation

Figure 3:
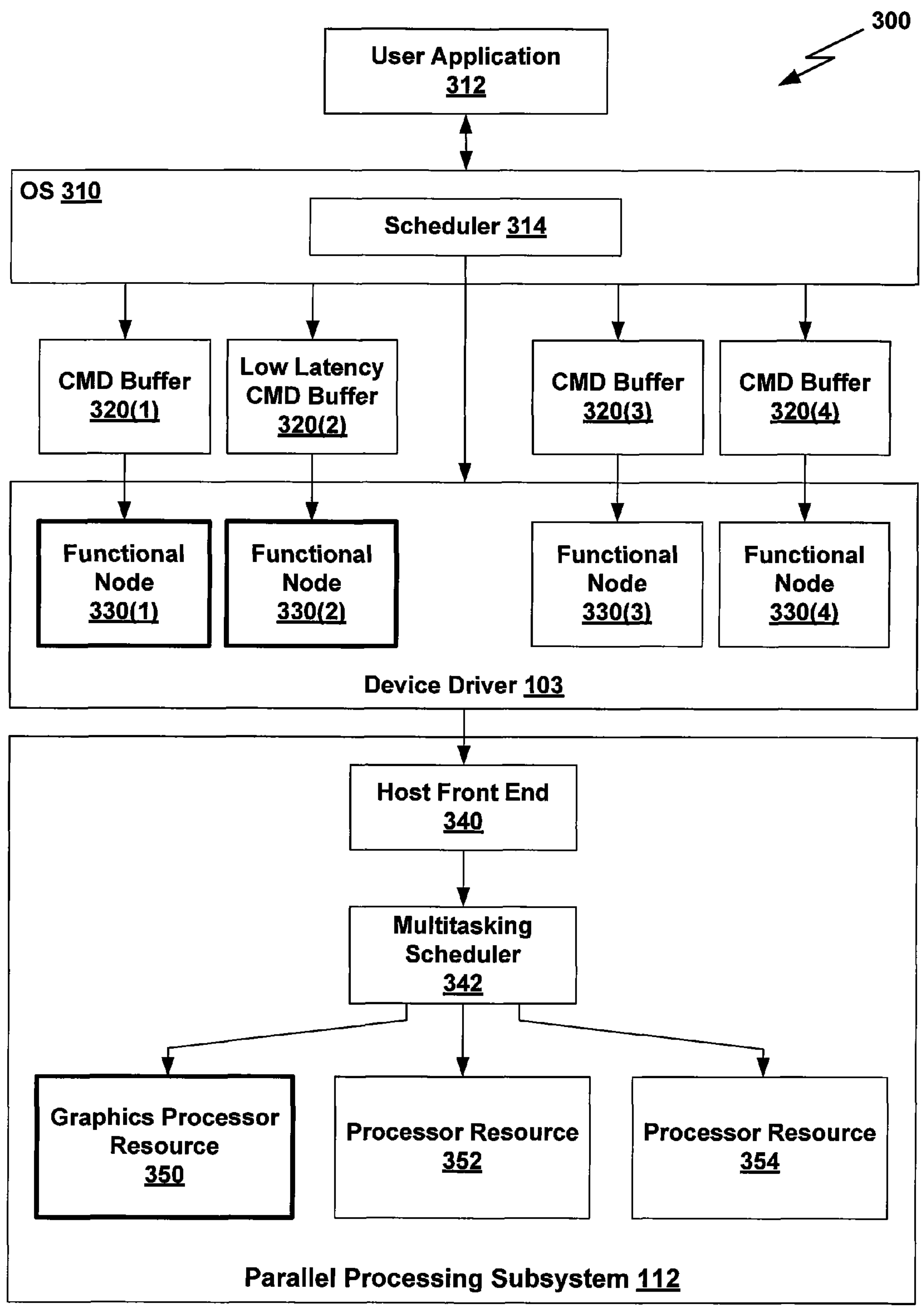
FIG. 3 illustrates a parallel processing system for low latency computation, according to one embodiment of the present invention.

FIG. 3 illustrates a parallel processing system 300 for low latency computation, according to one embodiment of the present invention. The parallel processing system 300 includes an operating system (OS) 310 executing on the CPU 102 of FIG. 1, a user application 312 executing within an execution environment provided by the OS 310, the device driver 103 executing on the CPU 102, and the parallel processing subsystem 112. In one embodiment the parallel processing subsystem 112 is a graphics processing unit (GPU).

The user application 312 generates sequential commands for execution on the parallel processing subsystem 112. The commands comprise tasks to be performed on the parallel processing subsystem 112. In one embodiment, a first set of commands comprises physics simulation tasks, which are sensitive to latency. The first set of commands is stored in a low latency command buffer 320(2) by the OS 310. A second set of commands comprises tasks for rendering a graphics scene based on results from the physics simulation tasks. The second set of commands is stored in command buffer 320(1) by the OS 310. The OS 310 attempts to gather a relatively large set of commands within command buffers 320 prior to submitting the commands for execution. For example, an entire frame of scene data may be accumulated in command buffer 320(1) prior to submission for execution. A scheduler 314 within the OS 310 determines when to submit a command buffer 320 to the device driver 103 for execution on the parallel processing subsystem 112.

A typical parallel processing subsystem 112 includes circuitry that implements a graphics processor resource 350, and processor resources 352, 354. In one embodiment, the graphics processor resource 350 comprises a programmable multithreaded computation unit such as PPU 202 of FIG. 2. The processor resources 352, 354 implement certain relatively fixed functions, such as video processing and display functions, data copy functions, and potentially other functions related to processing, capturing, and displaying graphics data. The device driver 103 exposes each processor resource 350, 352, 354 to the OS 310 as at least one functional node 330. For example, the device driver 103 exposes the graphics processor resource 350 as functional node 330(1), configured to receive commands for a graphics processor, and as functional node 330(2), configured to receive commands requiring low latency processing by the graphics processor resource 350. Functional node 330(1) is associated with command buffer 320(1), while functional node 330(2) is associated with low latency command buffer 320(2). Any technically feasible technique may be implemented to expose the processor resources 350, 352, 354.

The user application 312 generates tasks for physics simulation, which are stored within the low latency command buffer 320(2). Similarly, tasks for rendering a graphics scene are stored within command buffer 320(1). When the scheduler 314 within the OS 310 determines that tasks within a given command buffer 320 should be executed, the command buffer 320 is submitted to the device driver 103, via a functional node 330, for execution by a corresponding processor resource 350 within the parallel processing subsystem 112.

The OS 310 submits command buffers targeting a specific functional node 330 in serial order. In a conventional system, only one functional node 330 is exposed for the graphics processor resource 350. In the conventional system, low latency tasks can get stuck behind a much longer set of scene rendering tasks, as illustrated below in FIG. 4. By contrast, embodiments of the present invention provide two or more functional nodes 330(1), 330(2) for at least the graphics processor resource 350. Exposing the functional node 330(2) enables the OS 310 to schedule low latency tasks within the low latency command buffer 320(2), thereby avoiding scenarios where low latency tasks get stuck behind a much longer set of tasks typically associated with rendering a scene.

The parallel processing subsystem 112 includes, without limitation, a host front end 340, a multitasking scheduler 342, and the graphics processor resource 350. The parallel processing subsystem 112 may also include processor resources 352 and 354. The host front end 340 is configured to interface to memory bridge 105 of FIG. 1, and to read data from one or more command buffers 320 disposed in system memory 104, PP memory 204 of FIG. 2, of any technically feasible combination thereof. The multitasking scheduler 342 is configured to schedule execution of tasks within command buffers 320. In one embodiment, the multitasking scheduler 342 is configured to execute a subset of tasks within the command buffer 320(1), suspend execution of tasks within the command buffer 320(1), execute at least a subset of tasks within low latency command buffer 320(2), and then resume execution of tasks within the command buffer 320(1).

The graphics processor resource 350 may implement storage for two or more execution contexts, for example to store context information for tasks associated with the command buffer 320(1) and the low latency command buffer 320(2). Storing the two or more contexts may facilitate efficient context switches between the command buffer 320(1) and the low latency command buffer 320(2). In one embodiment, context information for tasks associated with the command buffer 320(1) is made inactive and context information for tasks associated with the low latency command buffer 320(2) is made active when tasks stored in the low latency command buffer 320(2) are executed. An active context is used by the parallel processing subsystem 112 for performing new computations.

Scheduling and context switching functions may be implemented using any technically feasible techniques without departing the scope and spirit of the present invention. In one embodiment, the multitasking scheduler 342 gives execution priority to tasks within the low latency command buffer 320(2) and selectively preempts execution of tasks associated with other command buffers 320.

Figure 4:
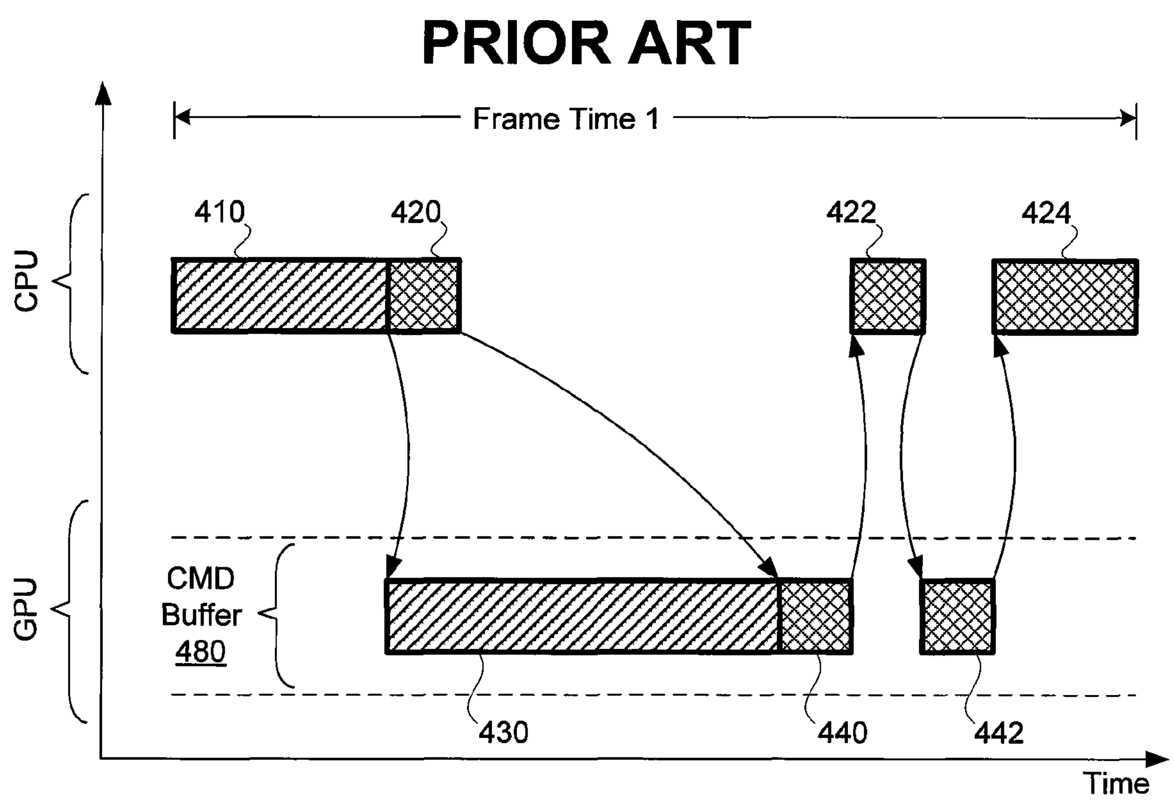
FIG. 4 illustrates an exemplary prior art work flow between a central processing unit and a parallel processing system.

FIG. 4 illustrates an exemplary prior art work flow between a central processing unit and a parallel processing system, such as a GPU. The CPU performs workload 410, comprising CPU tasks related to setting up a graphics scene for rendering. The CPU workload 410 results in GPU workload 430, comprising GPU tasks related to rendering the graphics scene. CPU workloads 420, 422, 424 comprise tasks related to physics simulation and setting up physics simulation on the GPU, defined by workloads 440 and 442. All GPU workloads, including GPU workloads 430, 440, 442, are stored in a command buffer 480, which provides a sequential first-in, first-out queue for execution of tasks on the GPU. GPU workload 430 depends on CPU workload 410 completing. Similarly, GPU workloads 440 and 442 depend on completion of CPU workloads 420 and 422, respectively. As shown, GPU workload 440 is not able to even start until GPU workload 430 completes, thereby creating a long delay from the completion of CPU workload 420 and the start of CPU workload 422. This dependency creates a cascade of delays leading to the completion of CPU workload 424 being delayed. In this example of prior art processing, workloads on the CPU and GPU execute serially in time rather than concurrently. Serialization occurs because of dependencies between the CPU and GPU workloads and because GPU workloads 440, 442 get stuck behind GPU workload 430.

Figure 5:
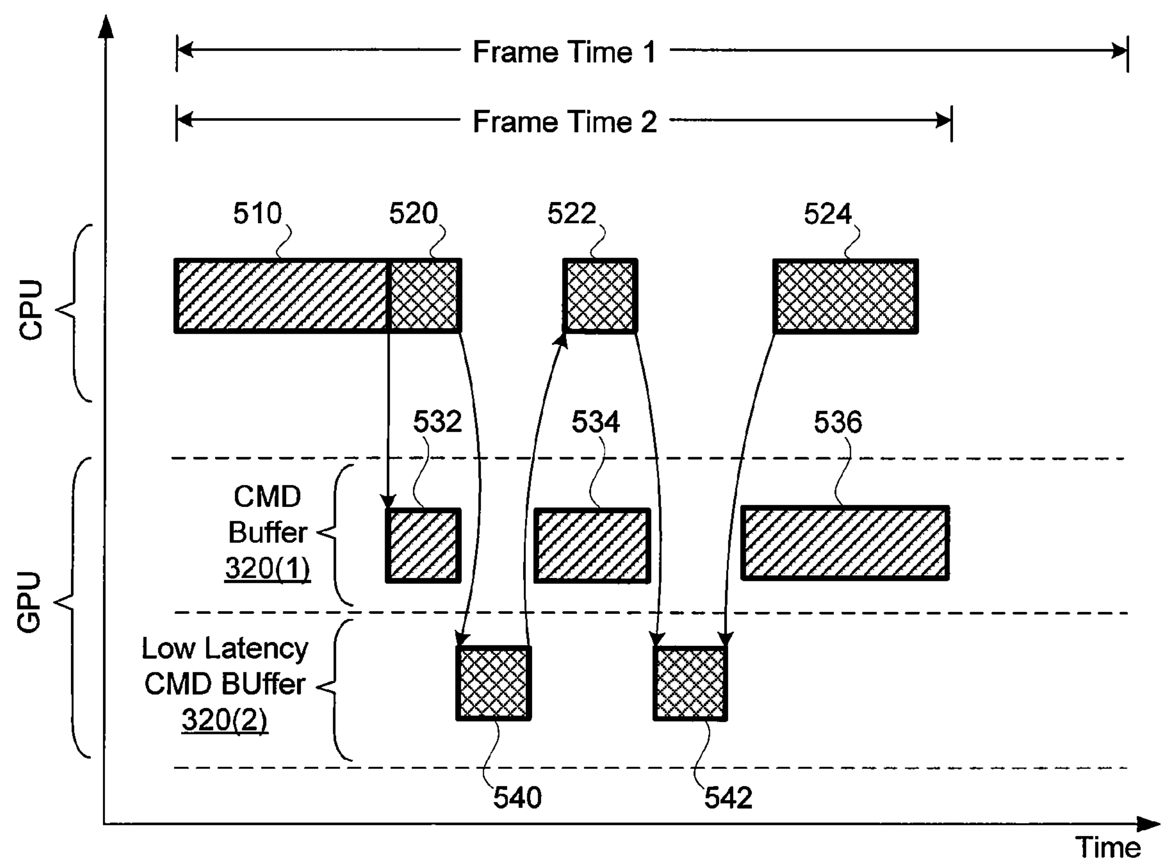
FIG. 5 illustrates an exemplary work flow between the central processing unit and a parallel processing system for low latency computation, according to one embodiment of the present invention.

FIG. 5 illustrates an exemplary work flow between the CPU 102 of FIG. 1 and the parallel processing subsystem 112, for low latency computation, according to one embodiment of the present invention. In one embodiment, the parallel processing subsystem 112 comprises a GPU. The CPU 102 performs CPU workload 510, comprising CPU tasks related to setting up a graphics scene for rendering. The CPU workload 510 results in GPU workloads 532, 534, and 536, which collectively comprise GPU tasks related to rendering the graphics scene. CPU workloads 520, 522, 524 comprise tasks related to physics simulation and setting up physics simulation on the GPU, defined by workloads 540 and 542. GPU workload 532 depends on CPU workload 510 completing. GPU workloads 534 and 536 represent a continuation of workload 532. GPU workloads 540 and 542 depend on completion of CPU workloads 520 and 522, respectively. The GPU workloads 532, 534, and 536 are buffered in command buffer 320(1). GPU workloads 540, 542, which require low latency processing, are buffered in low latency command buffer 320(2).

During GPU execution, the multitasking scheduler 342 initiates a context switch, causing GPU workload 540 to become active and execute. After GPU workload 540 executes, the multitasking scheduler 342 initiates a context switch back to the command buffer 320(1) to execute GPU workload 534, a continuation of GPU workload 532. The multitasking scheduler 342 subsequently initiates a context switch, causing GPU workload 542 to become active and execute. After GPU workload 542 executes, the multitasking scheduler 342 initiates a context switch back to the command buffer 320(1) to execute GPU workload 536, a continuation of GPU workloads 532, 534. Greater execution concurrency between the CPU and GPU is achieved because latency sensitive GPU workloads 540, 542 are processed sooner, allowing CPU workloads 522 and 524 to execute sooner and concurrently with GPU workloads.

Figure 6:
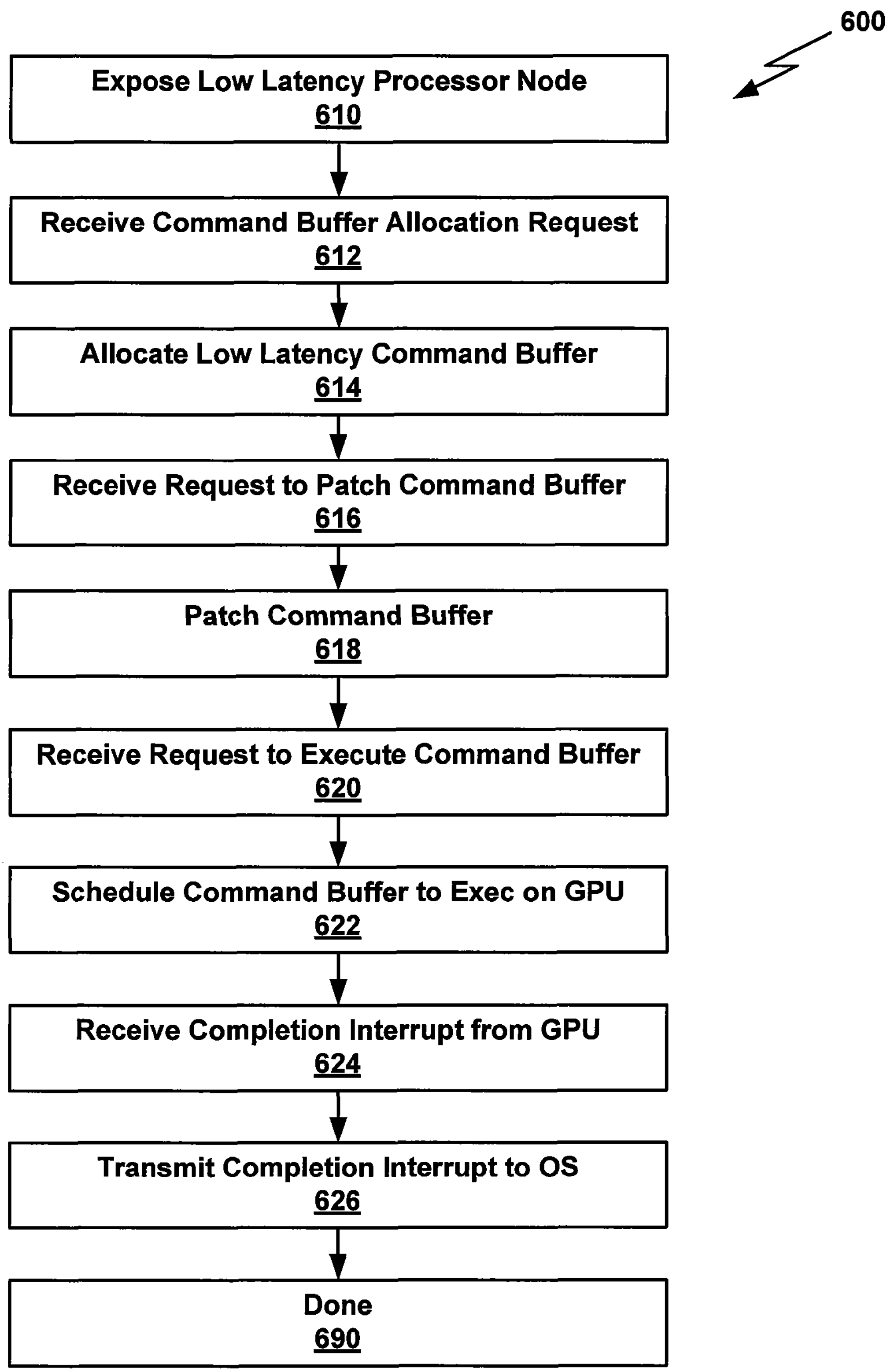
FIG. 6 is a flow diagram of method steps for low latency computation on the parallel processing subsystem, according to one embodiment of the present invention.

FIG. 6 is a flow diagram of method steps 600 for low latency computation on the parallel processing subsystem 112 of FIG. 1, according to one embodiment of the present invention. Although the method steps are described in conjunction with the systems of FIGS. 1-3, persons skilled in the art will understand that any system configured to perform the method steps, in any order, is within the scope of the present invention. In one embodiment, the parallel processing subsystem 112 comprises a GPU and the method steps 600 are performed by the CPU 102 executing the device driver 103.

The method begins in step 610, where the device driver 103 exposes a low latency functional node, such as functional node 330(2). The low latency functional node is configured to target an underlying processor resource shared with a generic functional node, such as functional node 330(1). In one embodiment, the low latency functional node is exposed to the operating system 310. In step 612, the device driver 103 receives a command buffer allocation request to allocate a low latency command buffer, such as low latency command buffer 320(2). In step 614, the device driver 103 allocates the requested low latency command buffer. Any command buffer structure may be implemented within the low latency command buffer without departing the scope and spirit of the present invention. The low latency command buffer may be allocated within the system memory 104, the PP memory 204 of FIG. 2, or any other technically feasible memory system. In step 616, the device driver 103 receives a request to patch the command buffer, whereby address references within the low latency command buffer are resolved to physical addresses. In step 618, the device driver 103 patches the low latency command buffer.

In step 620, the device driver 103 receives a request to execute the low latency command buffer on the GPU. The request to execute the low latency command buffer may be generated by the OS 310. In one embodiment, the request to execute the low latency command buffer is triggered when the low latency command buffer is filled to a specified threshold. Any technically feasible threshold may be implemented, such as a byte count or measure of occupancy. Alternatively, the request to execute the low latency command buffer may be triggered after a specified time out period has elapsed. One example of such a time out period is specified with respect to elapsed time since a most recent task was added to the low latency command buffer. In this example, the request to execute the low latency command buffer is triggered in response to elapsed time reaching the time out period. In step 622, the device driver 103 notifies the multitasking scheduler 342 within the GPU that the low latency command buffer should be scheduled for execution. The GPU subsequently reads the low latency command buffer and executes tasks contained therein. Upon completion, the GPU generates an interrupt directed to the CPU 102 executing the device driver 103. In step 624, the device driver 103 receives the interrupt from the GPU, indicating execution has completed for the low latency command buffer. In step 626, the device driver 103 transmits an interrupt to the OS 310, indicating execution has completed for the low latency command buffer. The method terminates in step 690.

In sum, a technique for performing low latency computation on a parallel processing subsystem is disclosed. The technique involves exposing a low latency functional node that targets a hardware processor resource shared by at least one additional functional node. Each functional node has a corresponding command buffer for storing related tasks assigned to the functional node by an operating system. Tasks within the command buffer are scheduled for execution on the parallel processing subsystem, which is able to context switch between at least one command buffer and the low latency command buffer. The low latency command buffer may be given execution priority by the parallel processing subsystem, thereby reducing execution latency for tasks associated with the low latency command buffer. Upon completion of tasks associated with the low latency command buffer, the parallel processing subsystem generates a completion interrupt, which is propagated to the operating system.

One advantage of the disclosed technique is that higher overall system performance may be achieved through improved execution concurrency between the CPU and the GPU.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for low latency computation in a parallel processing subsystem, the method comprising:

exposing a low latency functional node that shares a common underlying processor resource within the parallel processing subsystem with a generic functional node;

receiving a request to execute one or more tasks associated with the low latency functional node, wherein each of the one or more tasks is stored in a low latency command buffer, and wherein the request to execute the one or more tasks is generated by an operating system in response to a timeout that is generated by a device driver and associated with executing the low latency command buffer;

scheduling the low latency command buffer for execution in the parallel processing subsystem; and receiving a first completion interrupt from the parallel processing subsystem that indicates that the one or more tasks stored in the low latency command buffer have completed execution.

2. The method of claim 1, further comprising:

receiving an allocation request to allocate the low latency command buffer;

allocating the low latency command buffer within a memory coupled to the parallel processing subsystem;

receiving a request to patch the low latency command buffer; and patching the low latency command buffer to convert at least one reference associated with the one or more tasks to a physical address within the memory.

3. The method of claim 1, further comprising transmitting a second completion interrupt to an operating system in response to receiving the first completion interrupt.

4. The method of claim 1, wherein the parallel processing subsystem is configured to stop executing tasks associated with the generic functional node in order to execute tasks associated with the low latency functional node.

5. The method of claim 1, wherein the parallel processing subsystem is configured to execute first tasks associated with the low latency functional node that have a higher priority than tasks associated with the generic functional node.

6. A non-transitory computer-readable storage medium including instructions that, when executed by a processing unit, cause the processing unit to initiate low latency computation in a parallel processing subsystem, the method comprising:

exposing a low latency functional node that shares a common underlying processor resource within the parallel processing subsystem with a generic functional node;

receiving a request to execute one or more tasks associated with the low latency functional node, wherein each of the one or more tasks is stored in a low latency command buffer, and wherein the request to execute the one or more tasks is generated by an operating system in response to a timeout that is generated by a device driver and associated with executing the low latency command buffer;

scheduling the low latency command buffer for execution in the parallel processing subsystem; and receiving a first completion interrupt from the parallel processing subsystem that indicates that the one or more tasks stored in the low latency command buffer have completed execution.

7. The non-transitory computer-readable storage medium of claim 6, further comprising:

receiving an allocation request to allocate the low latency command buffer;

allocating the low latency command buffer within a memory coupled to the parallel processing subsystem;

receiving a request to patch the low latency command buffer; and patching the low latency command buffer to convert at least one reference associated with the one or more tasks to a physical address within the memory.

8. The non-transitory computer-readable storage medium of claim 6, further comprising transmitting a second completion interrupt to an operating system in response to receiving the first completion interrupt.

9. The non-transitory computer-readable storage medium of claim 6, wherein the parallel processing subsystem is configured to stop executing tasks associated with the generic functional node in order to execute tasks associated with the low latency functional node.

10. The non-transitory computer-readable storage medium of claim 6, wherein the parallel processing subsystem is configured to execute first tasks associated with the low latency functional node that have a higher priority than tasks associated with the generic functional node.

11. A computing device, comprising:

a parallel processing subsystem;

a processing unit coupled to the parallel processing subsystem, and configured to:

expose a low latency functional node that shares a common underlying processor resource within the parallel processing subsystem with a generic functional node;

receive a request to execute one or more tasks associated with the low latency functional node, wherein each of the one or more tasks is stored in a low latency command buffer, and wherein the request to execute the one or more tasks is generated by an operating system in response to a timeout that is generated by a device driver and associated with executing the low latency command buffer;

schedule the low latency command buffer for execution in the parallel processing subsystem; and receive a first completion interrupt from the parallel processing subsystem that indicates that the one or more tasks stored in the low latency command buffer have completed execution.

12. The computing device of claim 11, wherein the processing unit is further configured to:

receive an allocation request to allocate the low latency command buffer;

allocate the low latency command buffer within a memory coupled to the parallel processing subsystem;

receive a request to patch the low latency command buffer; and patch the low latency command buffer to convert at least one reference associated with the one or more tasks to a physical address within the memory.

13. The computing device of claim 11, wherein the processing unit is further configured to transmit a second completion interrupt to an operating system in response to receiving the first completion interrupt.

14. The computing device of claim 11, wherein the parallel processing subsystem is configured to stop executing tasks associated with the generic functional node in order to execute tasks associated with the low latency functional node.

* * * * *